United States Patent [19]

Hays

[11] Patent Number: 4,893,003
[45] Date of Patent: Jan. 9, 1990

[54] CIRCLE-TO-LINE INTERFEROMETER OPTICAL SYSTEM

[75] Inventor: Paul B. Hays, Ann Arbor, Mich.
[73] Assignee: The University of Michigan, Ann Arbor, Mich.
[21] Appl. No.: 246,096
[22] Filed: Sep. 19, 1988
[51] Int. Cl.$^4$ ............................................. H01J 3/14
[52] U.S. Cl. ................................... 250/216; 350/630
[58] Field of Search ................ 250/216; 356/616, 630

[56] References Cited
U.S. PATENT DOCUMENTS
2,934,755  4/1960  Canada ................................ 350/630

Primary Examiner—Edward P. Westin
Assistant Examiner—Khaled Shami
Attorney, Agent, or Firm—Rohm & Monsanto

[57] ABSTRACT

An optical system employs an internally conical reflector for converting circular fringe information, such as that which is produced by a Fabry-Perot Interferometer, into linear information whereby the reflected light can be received by conventional linear array detectors, such as charge coupled device which are used in spectroscopic analysis. The azimuthal angle of the detected circular fringe pattern is reduced with the use of a telekaleidoscope having a predetermined arrangement of mirrors. Electromagnetic energy which is issued from the interferometer is propagated substantially along the conical axis of the cone of which the reflector forms a segment, and is reflected and focused substantially onto a line in the vicinity of the conical axis, where the linear detector is situated. In a preferred embodiment, the apex of the cone is situated where the conical axis intersects the focal plane of the circular fringe pattern.

17 Claims, 3 Drawing Sheets

CIRCLE-TO-LINE INTERFEROMETER OPTICAL SYSTEM

BACKGROUND OF THE INVENTION

This invention relates generally to optical systems for interferometry, and more particularly, to a system for converting a circular ring spectrum of the type generally produced by an interferometer, such as the well-known Fabry-Perot interferometer, to a linear pattern which is similar to that produced by a conventional spectroscope, and which can be scanned using relatively inexpensive and simple commercially available detection devices.

The commercial success of linear spectroscopic instruments, such as grating spectrometers where the spectral information is presented as a linear pattern, has resulted in significant advances in the production of simple array detectors which assist in the automatic analysis of the spectral information. However, such is not the case in the field of interferometry. Interferometers have suffered in the commercial market as a result of the lack of simple array detectors which are capable of being applied to the circular geometry of the typical interference pattern.

Many interferometers used for testing and spectral analysis produce information in the form of circular rings or fringes. Such devices are employed in the laboratory, in geophysical observations, and in astonomical observations. The most widely known of these is the Fabry-Perot interferometer which creates a spectrum for monochromatic light comprised of equal area rings at the infinity focus of an objective lens system. The circular interference patterns must be analyzed quantitatively to extract the information provided by the optical instrument.

A number of complex scanning strategies have been developed to extract the information from the circular interference pattern. One known technique includes the "pinhole" scan which is accomplished by varying the etalon optical path either by changing the index of refraction, or by actually moving the plates. More recently, complex image plane detectors which have an anode structure which matches the fringe pattern have been produced. There is a need, however, for a system which simplifies the analysis of interferometric information by converting the information in the circular rings to a pattern which easily can be analyzed, as is the case with the conventional spectrometer, while retaining the technical and other advantages of an interferometer.

It is, therefore, an object of this invention to provide a simple and economical system for analyzing circular fringe information produced by an interferometer.

It is another object of this invention to improve the resolution with which circular fringe information from an interferometer can be analyzed.

It is also an object of this invention to provide a system for monitoring and analyzing circular fringe information using a linear array detector.

It is a further object of this invention to provide a system which is efficient in its employment of circular fringe energy during analysis of the information contained therein.

SUMMARY OF THE INVENTION

The foregoing and other objects are achieved by this invention which provides an optical system for converting information in the form of circular fringes, or rings, of electromagnetic radiation, to a linear form. In accordance with the invention, the optical system utilizes a reflector arrangement having a reflective surface configured over at least a portion thereof to be internally conical. The internally conical surface receives the electromagnetic radiation containing the circular fringe information and reflects same to a detector. In accordance with invention, the detector is of the linear type, and is oriented with respect to the reflector to receive the reflected electromagnetic radiation.

In a particularly advantageous embodiment of the invention, the internal conical surface of the reflector is arranged at 45° with respect to a central axis of the cone. The linear detector is arranged in the vicinity of the central axis and receives a form of the electromagnetic radiation which has been linearized by the reflector. Moreover, the reflector is arranged so that the direction of propagation of the electromagnetic radiation is substantially parallel to the central axis.

In a further embodiment of the invention, the conical reflector is arranged to have an apex, or virtual apex, on the central axis. Moreover, the electromagnetic radiation has a focal plane which is transverse to the central axis, and preferably perpendicular to the optical axis. The apex of the conical surface is substantially coincident with the point where the central axis intersects the transverse focal plane of the electromagnetic radiation.

In a particularly advantageous embodiment, the linear detector is formed of at least one charge coupled device which produces at an output thereof an electrical signal which is responsive to a predetermined characteristic of the electromagnetic radiation impinging thereon. In a practical embodiment of the invention, the reflective surface is not a complete cone, but rather is a conical segment. In such an embodiment, since the electromagnetic radiation comprising the circular ring information is propagated concentrically along the central axis of the cone of which the reflector forms a part, it is desired to concentrate the electromagnetic energy so that most, if not all, of the energy impinges upon the reflector segment. In one specific embodiment of the invention, the azimuthal angle of the electromagnetic radiation is reduced by a kaleidoscopic device. The kaleidoscopic device may be a tele-kaleidoscope, illustratively of 90 degrees, and performs the sectoring function.

In accordance with a further aspect of the invention, an optical system converts information in the form of a circular ring of electromagnetic radiation to a linear form thereof using a kaleidoscopic device having a plurality of reflector members therein. The reflector members determine a segment of the circular ring of the electromagnetic radiation which will be propagated to a conical reflector adapted to receive the segment of the circular ring of electromagnetic radiation, and reflect said segment focused onto a linear detector.

As discussed hereinabove, in certain embodiments of the invention, of the reflector members of the kaleidoscopic device are arranged at 90° with respect to one another, and the conical reflector is arranged at 45° with respect to a central axis thereof. The central axis of the reflector is parallel to a central axis of the kaleidoscopic device. Also, the electromagnetic energy reflected by the reflector is focused substantially on the central axis.

In accordance with a method aspect of the invention, a method of converting circular interferometric information into electrical information utilizes the step of reflecting a light signal containing the circular interferometric information from a conical reflector. This aspect of the invention employs the further step of receiving the reflected light signal at a detector which converts the reflected light signal to a corresponding electrical signal.

In a specific embodiment of this method aspect of the invention, there is provided the further step of sectoring the light signal containing the circular interferometric information, whereby the circular interferometric information is contained in a segment, or sector, of a circle. In a preferred embodiment, the step of sectoring is performed using a kaleidoscopic device, such as a telekaleioscope. The detector at which the reflected light is received may be any linear detector, such as a charge coupled device, and further may be arranged at an angle of approximately 45° with respect to the conical reflector.

BRIEF DESCRIPTION OF THE DRAWING

Comprehension of the invention is facilitated by reading the following detailed description, in conjunction with the annexed drawing, in which.

DETAILED DESCRIPTION

Figure 1:
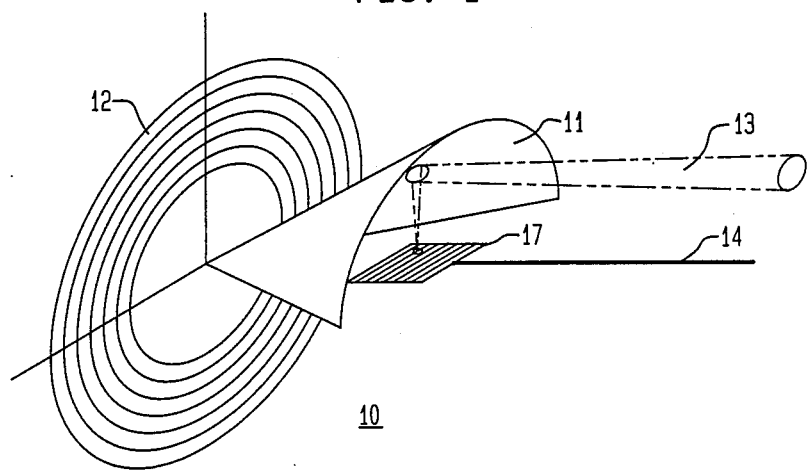
FIG. 1 is a schematic representation of a conical circle-to-line converter constructed in accordance with the principles of the invention and illustrating the manner in which a ray bundle of electromagnetic energy containing circular, or fringe information is converted to linear information.

FIG. 1 is a schematic representation of a conical circle-to-line converter constructed in accordance with the principles of the invention and illustrating the manner in which a ray bundle of electromagnetic energy containing circular, or fringe information is converted to linear information. As shown in this figure, a conical reflector segment 10 is provided with an interior reflective surface 11 which is oriented so as to reflect electromagnetic radiation, or light, in the form of a circular fringe pattern 12 which contains information of the type which may be obtained from an interferometer (not shown). For purposes of the present description, a portion of the electromagnetic radiation is represented schematically in the figure as a ray bundle 13 of the incoming light.

As shown, ray bundle 13 is propagated in a direction which is substantially parallel to a conical axis 14 which coincides with the central axis of the cone-shaped figure of which interior reflective surface 11 forms a part. The conical axis, as will be described in greater detail hereinbelow with respect to FIG. 2, intersects the focal plane of circular fringe pattern 12 at its center.

Referring once again to ray bundle 13 in FIG. 1, the electromagnetic energy, or light, is reflected, onto a detector 17. In addition, ray bundle 13, after being reflected off of interior reflective surface 11 onto detector 17, is focused onto a line which corresponds substantially in location with conical axis 14.

Figure 2:
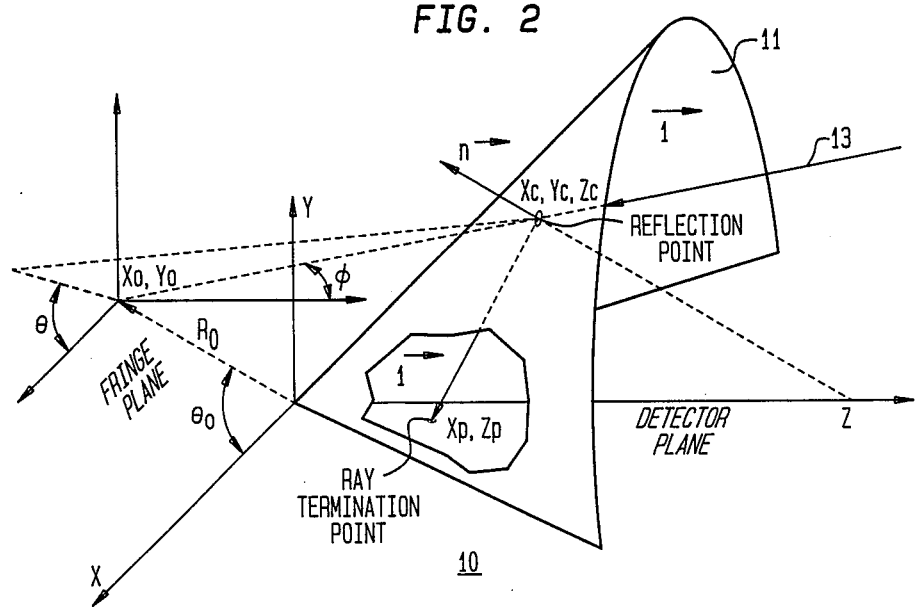
FIG. 2 is a diagram which is useful in understanding the trigonometry of the invention.

FIG. 2 is a diagram which is useful in understanding the optical geometry of the invention. In the embodiment of FIG. 2, elements of structure which bear analogous correspondence to those discussed above with respect to FIG. 1 are similarly designated. In this specific illustrative embodiment, interior reflective surface 11 is a segment of a 45° cone and is shown with its vertex located at the X-Y plane, referred to hereinafter as the "fringe plane." Detailed geometrical ray traces of groups of rays, such as ray bundle 13, have been carried out to assist in the development of various embodiments of this invention. The ray trace, for a ray bundle, such as ray bundle 13, follows the set of rays which would have struck the fringe plane at the point ($X_0$, $Y_0$), as they reflect from the cone and intersect with the X-Y plane. The X-Y plane will hereinafter be referred to as the "detector plane." Spot diagrams are produced when the rings formed on the fringe plane by the etalon and objective lens are traced to the detector plane. These spot diagrams characterize the ability of the various embodiments of this invention to convert the circular rings in the fringe plane into truly linear patterns in the detector plane.

A discussion of the results of these exact ray tracings is useful in developing an understanding of the characteristics of the present invention. The important parameter in determining the shape of the linear pattern in the detector plane is the divergence of the ray bundle, the half cone angle $\phi$, which is determined by the combination of the interferometer and its objective lens. For normal Fabry-Perot interferometers where the f/# is large, in the range of 5 to 20, the divergence angle $\phi$ is small ranging from 1.4 to 5.7 degrees. Under these conditions the broadening of the linear pattern of the transformed rings is very small. For a practical embodiment of this invention where light from a 90° cone segment is focussed on the detector plane, the half width of the resulting line in the Z direction is less than 0.005 of the Z distance from the apex of the cone. This produces an effective broadening of the interferometric fringes creating a defect finesse of greater than 200 for a single order Fabry-perot interferometer. Few detectors for modern interferometers can match this quality. When alternative configurations are evaluated it becomes apparent that for high f/# systems, the effective aperture defect due to the line broadening is very small.

The previous ray trace has ray distributions which correspond effectively the aperture broadening functions that must be applied to the fringe pattern produced by a Fabry-Perot interferometer if it is to be scanned in the detector plane of the conical optical system. The broadening functions depend only on the radius of the ring being converted, the divergence angle of the ray bundle striking the fringe plane, and the azimuthal extent of the ring being transformed. In practice the divergence angle is determined by the effective f/# of the imaging system and the azimuth angle of the ring is determined by practical considerations of how large an acceptance angle can be tolerated at the detector. Most real detectors will not act effectively over angles greater than about 45° and thus only one quarter of a full ring would generally be effectively detected. It is however possible to fold the ring optically into a segment with almost any desired azimuthal extent.

Figure 3:
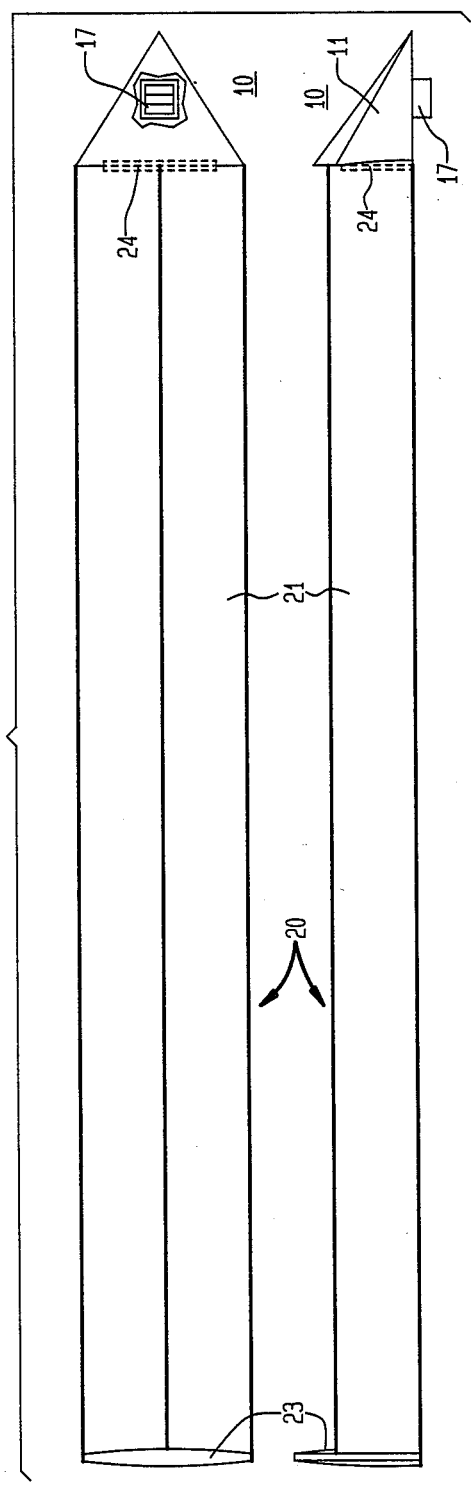
FIG. 3 is a schematic diagram of an embodiment of the invention which employs a kaleidoscopic element to reduce the azimuthal angle.

FIG. 3 is a schematic diagram of an embodiment of the invention which employs a kaleidoscopic element 20 (shown schematically) having kaleidoscopic mirrors 21 for reducing the azimuthal angle. The mirrored kaleidoscope provides a very effective means for converting all of the light that would fall on a complete circle in the fringe plane into a smaller angular segment. This is illustrated in FIG. 3 where a simple 90° tele-kaleidoscope made up of a segment of a simple telescopic objective 23 with two mirrors joined at the optical axis of the lens system and the transforming cone. The addition of a second lens 24 at the cone mouth to make rays telecentric. Lens 24 is not essential, but decreases the ray bundle effective divergence angle and thus decreases spread on the detector plane. The etalon for a Fabry-Perot interferometer would be located in front of the objective lens.

When viewed from the fringe plane, which passes through the vertex of the cone, it would appear as if there were four identical etalons and objective lenses, the real one above three mirrored images forming a crossed pattern. This apparent set of four etalons determines the ray bundle divergence angle as projected onto the fringe plane. It should be noted that many possible optical arrangements using various kaleidoscope angle combinations could be useful in achieving the function set forth herein, and are contemplated within the scope of the claimed invention. The primary significance of this optical arrangement is that the circular fringe pattern of an interferometer is now replaced by a ring segment having an azimuthal extent which is determined by the arrangement of the mirrors in the kaleidoscope. The conical circle-to-line converter at the end of the arrangement transforms the fringe rings into the line pattern discussed hereinabove.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An optical system for converting information in the form of a circular ring of electromagnetic radiation to a linear form, the optical system comprising:
   reflector means having a reflective surface configured at least in part as an internal conical surface, for receiving and reflecting the electromagnetic radiation; and
   linear detector means arranged to receive the electromagnetic radiation reflected by said reflective surface of said reflector means.

2. The optical system of claim 1 wherein said internal conical surface of said reflector means is arranged at 45° with respect to a central axis.

3. The optical system of claim 2 wherein said linear detector means is arranged in the vicinity of said central axis for receiving a linear form of the electromagnetic radiation.

4. The optical system of claim 2 wherein the electromagnetic radiation is propagated in a direction substantially parallel to said central axis and has a focal plane transverse to said central axis, said internal conical surface having a vertex on said central axis.

5. The optical system of claim 4 wherein said vertex of said internal conical surface is substantially coincident with the focal plane of the electromagnetic radiation.

6. The optical system of claim 1 wherein said linear detector means comprises a charge coupled device for producing an electric signal responsive to the electromagnetic radiation.

7. The optical system of claim 1 wherein there is further provided kaleidoscopic means for reducing an azimuthal angle of the electromagnetic radiation.

8. The optical system of claim 7 wherein said kaleidoscopic means comprises a 90° tele-kaleidoscope.

9. An optical system for converting information in the form of a circular ring of electromagnetic radiation to a linear form, the optical system comprising:
   kaleidoscopic means having a plurality of reflector members for determining a segment of the circular ring of the electromagnetic radiation;
   conical reflector means having a reflective surface configured substantially as an internal conical surface, for receiving and reflecting said segment of the circular ring of the electromagnetic radiation; and
   linear detector means arranged to receive the electromagnetic radiation reflected by said reflective surface of said reflector means.

10. The optical system of claim 9 wherein said reflector members of said kaleidoscopic means are arranged at 90° with respect to one another.

11. The optical system of claim 9 wherein said reflective surface of said conical reflector means is configured at least in part to be oriented at 45° with respect to a central axis of said kaleidoscopic means.

12. The optical system of claim 11 wherein said linear detector means is arranged in the vicinity of said central axis for receiving a focused linear form of the electromagnetic radiation from said conical reflector means.

13. A method of converting circular interferometric information into electrical information, the method comprising the steps of:
   reflecting a light signal containing the circular interferometric information from a conical reflector; and
   receiving said reflected light signal at a linear detector which converts said reflected light signal into a corresponding electrical signal.

14. The method of claim 13 wherein prior to performing said step of reflecting there is provided the further step of sectoring the light signal containing the circular interferometric information whereby the circular interferometric information is contained in a sector of a circle.

15. The method of claim 14 wherein said step of sectoring is performed using a tele-kaleidoscope.

16. The method of claim 13 wherein said detector at which said reflected light signal is received is a charge coupled device.

17. The method of claim 13 wherein said conical reflector is arranged at an angle of approximately 45° with respect to a direction of propagation of said light signal.

* * * * *